US006948064B2

(12) United States Patent
Smith, Sr. et al.

(10) Patent No.: US 6,948,064 B2
(45) Date of Patent: Sep. 20, 2005

(54) METHOD AND APPARATUS FOR PROVIDING PUBLIC KEY SECURITY CONTROL FOR A CRYPTOGRAPHIC PROCESSOR

(75) Inventors: Ronald M. Smith, Sr., Wappingers Falls, NY (US); Edward J. D'Avignon, Kingston, NY (US); Robert S. DeBellis, Raleigh, NC (US); Randall J. Easter, Poughquag, NY (US); Lucina L. Green, Verbank, NY (US); Michael J. Kelly, Poughkeepsie, NY (US); William A. Merz, Wappingers Falls, NY (US); Vincent A. Spano, Poughkeepsie, NY (US); Phil Chi-Chung Yeh, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 843 days.

(21) Appl. No.: 09/748,839

(22) Filed: Dec. 27, 2000

(65) Prior Publication Data

US 2001/0001155 A1 May 10, 2001

Related U.S. Application Data

(62) Division of application No. 08/884,724, filed on Jun. 30, 1997, now Pat. No. 6,339,824.

(51) Int. Cl.[7] .............................................. H04L 9/00
(52) U.S. Cl. ....................... 713/168; 713/200; 713/187; 713/193; 380/28
(58) Field of Search ................................. 713/168, 200, 713/187, 193, 190, 120, 126, 181; 380/28, 44

(56) References Cited

U.S. PATENT DOCUMENTS

| 4,405,829 A | | 9/1983 | Rivest et al. |
| 4,747,139 A | * | 5/1988 | Taaffe .......................... 380/44 |
| 4,755,940 A | | 7/1988 | Brachtl et al. |
| 5,537,642 A | * | 7/1996 | Glowny et al. ............. 713/200 |
| 5,572,590 A | | 11/1996 | Chess |

OTHER PUBLICATIONS

Bruce Schneier, Applied CryptographyJohn Wiley Oct. 1995, pp. 34–37, 58–59.*

(Continued)

*Primary Examiner*—Kim Vu
*Assistant Examiner*—Thanhnga Truong
(74) *Attorney, Agent, or Firm*—William A. Kinnaman, Jr.

(57) ABSTRACT

Public key security control (PKSC) is provided for a cryptographic module by means of digitally signed communications between the module and one or more authorities with whom it interacts. Authorities interact with the crypto module by means of unsigned queries seeking nonsecret information or signed commands for performing specified operations. Each command signed by an authority also contains a transaction sequence number (TSN), which must match a corresponding number stored by the crypto module for the authority. The TSN for each authority is initially generated randomly and is incremented for each command accepted from that authority. A signature requirement array (SRA) controls the number of signatures required to validate each command type. Upon receiving a signed command from one or more authorities, the SRA is examined to determine whether a required number of authorities permitted to sign the command have signed the command for each signature requirement specification defined for that command type. A command requiring multiple signatures is held in a pending command register (PCR) while awaiting the required cosignatures. The crypto module also stores a single crypto module signature sequence number (CMSSN) which it increments for each reply to any authority to enable one authority to determine whether any other authority has communicated with the module.

19 Claims, 10 Drawing Sheets

OTHER PUBLICATIONS

"Applied Cryptography" Second Edition, Protocols, Algorithms and Source Code in C, by B. Schneier, 1996, pp. 466–471.

"Efficient Methods for Two Party Entity Authentication and Key Exchange in a High Speed Environment" by E. Basturk et al., IBM Technical Disclosure Bulletin, vol. 38, No. 03, Mar. 1995.

"Message Replay Prevention Using A Previously Transmitted Random Number To Sequence The Messages" by W. C. Martin, IBM Technical Disclosure Bulletin, vol. 27, No. 3, Aug. 1984.

"Personal Verification and Message Authentication Using Personal Keys" by R. E. Lennon et al., IBM Technical Disclosure Bulletin, vol. 24, No. 12, May 1982.

"SNA Bind Security Enhancement" by R. E. Lennon et al., IBM Technical Disclosure Bulletin, vol. 26, No. 10A, Mar. 1984.

"Transaction Incrementing Message Authentication Key" by W. D. Hopkins, IBM Technical Disclosure Bulletin, vol. 26, No. 1, Jun. 1983.

* cited by examiner

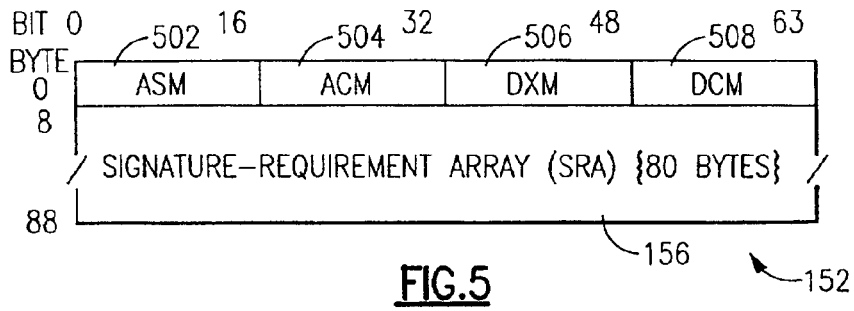

FIG.5

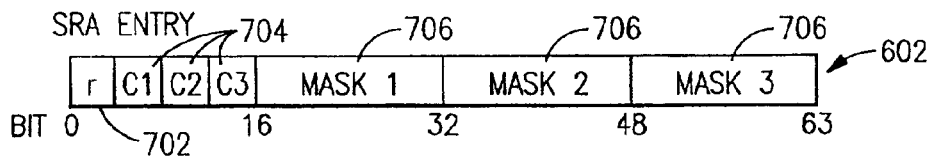

FIG.7

| BYTE | SIGNATURE-REQUIREMENT ARRAY (SRA) 156 | |
|---|---|---|
| 0 | ENTRY 0, FOR LOAD AUTHORIZATION PUBLIC MODULUS (LAP) | 602 |
| 8 | ENTRY 1, FOR LOAD PKSC CONTROL BLOCK (LCB) | 602 |
| 16 | ENTRY 2, FOR ZEROIZE DOMAIN (ZD) | 602 |
| 24 | ENTRY 3, FOR LOAD ENVIRONMENT-CONTROL MASK (LEC) | |
| 32 | ENTRY 4, FOR EXTRACT AND ENCRYPT MASTER KEY (XEM) | |
| 40 | ENTRY 5, FOR LOAD KEY PART (LKP) | |
| 48 | ENTRY 6, FOR EXTRACT AND ENCRYPT SMK OR RMK (XES OR XER) | |
| 56 | ENTRY 7, FOR LOAD AND COMBINE SMK OR RMK (LCS OR LCR) | |
| 64 | ENTRY 8, FOR REENCIPHER TO SMK OR RMK (RTS OR RTR) | |
| 72 | ENTRY 9, FOR REENCIPHER FROM SMK OR RMK (RFS OR RFR) | |

FIG.6

METHOD AND APPARATUS FOR PROVIDING PUBLIC KEY SECURITY CONTROL FOR A CRYPTOGRAPHIC PROCESSOR

CROSS-REFERENCE TO RELATED APPLICATIONS

This application is a division of prior application Ser. No. 08/884,724, filed June 30, 1997, now U.S. Pat. No. 6,339,824, which application is related to the following commonly owned applications, filed concurrently with the prior application and incorporated herein by reference:

R. M. Smith, Sr. et al., "Method and Apparatus for the Secure Transfer of Objects Between Cryptographic Processors", Ser. No. 08/885,612, now U.S. Pat. No. 6,144,744;

R. M. Smith, Sr. et al., "Method and Apparatus for Controlling the Configuration of a Cryptographic Processor", Ser. No. 08/884,721, now U.S. Pat. No. 6,108,425.

BACKGROUND OF THE INVENTION

1. Field of the Invention

This invention relates to a method and apparatus for providing security control in a crypto module and, more particularly, to a method and apparatus for providing public key security control in the cryptographic coprocessor of a general-purpose computer.

2. Description of the Related Art

Cryptographic functions of a general-purpose computer such as data encryption, digital signature processing and key management have often been performed by a cryptographic coprocessor, both for performance reasons and because of the special security problems posed by the cryptographic environment. One example of a cryptographic coprocessor in an IBM S/390 environment is the Integrated Cryptographic Facility (ICRF). ICRF was used with processors employing bipolar technology. With the migration to CMOS processor technology, as exemplified by the S/390 Parallel Enterprise Server, new technological challenges have arisen in the design of a cryptographic coprocessor that is optimized for a CMOS setting.

The previous implementation of the Integrated Cryptographic Facility (ICRF) involved a manual control panel with multiple physical keys for dual control, a crypto storage unit, a crypto computational unit, and a secure cable to connect these together. All of these units had to be tamper-resistant to prevent passive and active attacks. This involved significant cost in previous implementations, and in future machines the implementation difficulties and costs associated with this approach, especially in regard to the secure cable, are prohibitive.

Thus, the tamper-resistant cable used on the Integrated Cryptographic Facility for bipolar machines (bipolar ICRF) is physically too large to be used on a CMOS cryptographic coprocessor. The cost of this cable is also prohibitive. For a CMOS cryptographic coprocessor, a smaller and less expensive physical interface is required. At the same time, it is desirable to provide improved operational and security characteristics for this replacement of physical locks and keys and manual key part entry.

In previous installations, the mainframe in which the ICRF is installed was placed in an area (sometimes referred to as a dark room) which is kept secure and is not easily accessible to operations personnel. In such installations, it would be desirable to provide the manual functions by means of a remote capability, rather than to require operations personnel to enter the dark-room area.

Stolen, tampered, or counterfeit cryptographic processors can be used by an attacker to subvert a customer's system. The customer and the manufacturer need a reliable way to detect whether a cryptographic processor actually originated from the putative manufacturer.

Bipolar ICRF provided physical locks and keys to enable or disable the unit or to prepare for key part entry. The mechanical characteristics of the lock were such that activation of some functions required two physical keys. In one sense, two physical keys provide dual control in that each key can be held by a different individual. However, in another sense, physical keys can be used to provide much more than just dual control. Since the keys are physical and the lock is physical and is in a physical location, it is possible to use physical protection in the form of security officers who can monitor entry to the machine room. Also, the physical switch position can be monitored physically. Thus, in most cases the protocol actually used involves more than just two people. In the same way, different requirements can be administered for different switch positions and functions.

Various schemes replacing physical locks and keys with digital signatures (e.g., using RSA private signature keys) are imaginable. One possible mechanism is dual control; that is, any two signatures is sufficient. But the discussion above shows that there are often more than just two authorities involved in most actual installations. Physical keys also have characteristics that do not easily map to RSA private keys. For example, physical keys can be locked up, they can be shared by several individuals, and they can be watched carefully when handed to someone else. This leads to the conclusion that a great many more than two or three private keys may be needed.

Another alternative is an N-out-of-M scheme where the number N can be selected by a customer for each type of operation. This also is not sufficient if the customer desires, for example, to authorize one group of individuals to enable or disable crypto and another group to enter key parts.

Another set of complexities arises when one considers the fact that a customer may be organized along department lines. That is, it may be that the requirement is to permit crypto to be enabled only if approved by at least one individual from department A and one individual from department B. Also, with RSA private keys, it may be desirable to assign separate RSA private keys to workstations and to individuals. Thus, it may be necessary to include a scheme which permits separate sets of criteria for the private keys assigned to people and those assigned to work stations.

Not only does the basic command logic present design problems, but the practical implementation of a multiple-control system presents problems as well. As noted above, dual control, a well-established concept in security, is a process or enforcement mechanism which requires the participation of two separate parties (or authorities) to complete the action. This concept may be extended to multiple control, in which N of M authorities must sign a request before it can be performed.

One way to provide multiple control is to define a command format with a variable number of signatures. Generation of such a format could be done with a reasonable amount of coordination between authorities, but the variable nature of the format would be complex to handle in hardware and would substantially increase the maximum required message size.

Another possible mechanism is a separate pending command register for each authority. However, this uses up even more space in a cryptographic processor and also leads to complexity to cover the action to be taken when the authorities load different commands.

One approach might be a single pending command register which is loaded by one authority and then matched by all other authorities. But additional problems are encountered, such as how the record of successful signatures is kept. Of particular significance is the matching criteria. It is undesirable to require that the entire command match bit for bit, since this would not fit, for example, with the use of a different transaction ID for each authority. On the other hand, if no time-dependent information is required in the match, then there is a possibility of replay. Also, appropriate actions must be defined to handle the case when the original command is changed before all the supporting signatures have been received.

A very important requirement for a cryptographic processor is the ability to demonstrate that the unit is not susceptible to various types of attacks. Many subtle attacks depend on the ability to cover the tracks. For example, a special security mode may permit a program to obtain many keys in the clear. If it is possible to turn this special security mode on and off without being detected, then there is a much greater exposure in this area than if the fact that the mode has changed cannot be covered up.

As another example of a subtle attack, suppose that someone adds some steps to a master key loading program so that after a current master key register has been loaded with the correct secret value, then a known value is loaded into a new master key register. Then, as operational keys are loaded and enciphered under the current master key, they are also being reenciphered under the known new master key. Finally, the new master key value is erased, leaving the machine in the same state as it would have been if no new master key had been loaded. If the evidence of these extra steps can be covered, no one knows that the master key loading program has been modified or that the secret information has been compromised.

Many similar situations and windows exist, especially during initialization of a cryptographic processor. To maintain security and integrity, a customer needs be sure that the proper procedures have been used to set up the cryptographic processor and that no one has tampered with it during or after the initialization process.

To provide security in the cryptographic processor, it is necessary to prevent replay of signed commands. For example, there may a command to enable the special security mode and a command to disable it. If commands could be replayed, then after special security has been enabled and then disabled, the attacker could replay the command to enable the module.

To avoid replay, there must be time-dependent information associated with the commands. Then, if a command which was valid at one point in time is sent later, the hardware will reject it. However, depending on the nature of this time-dependent information, it may cause problems in performance or error recovery. For example, one possible method to ensure that commands cannot be replayed is to generate a new random transaction ID after each transaction; but this requires that the new value be queried before the next transaction can be performed. Another approach is to use sequence numbers, but this leads to replay problems if the crypto module is reset and the sequence repeats. Also, when an error occurs, the program may not know whether the error occurred in the information transmitted to the cryptographic processor or in the information returned from it, leading to the exposure that the sequence numbers at the two ends are out of step.

SUMMARY OF THE INVENTION

In accordance with the present invention, control of a cryptographic processor is provided without a tamper-resistant cable, without physical switches, and without a physical key entry device. Physical keys are replaced by RSA private keys and the tamper-resistant cable is replaced with a new command interface referred to herein as the public key security control (PKSC) interface, to be described in more detail below.

An RSA secret exponent is burned into the cryptographic processor at the factory. The public key associated with the chip is then kept in a crypto chip database that can be queried by a service representative and the customer to ensure that the cryptographic processors have not been compromised. The crypto chip database can contain information to indicate the current status of each chip, including such states as: not yet shipped, installed at customer N, returned to the manufacturer, destroyed, or missing.

Query commands are provided to permit nearly all information associated with the chip to be verified. Public information is provided in the clear and hash patterns are supplied to validate secret information. Query IDs are used to guarantee freshness and hardware signatures are used to guarantee authenticity and integrity.

Secret RSA public-private key pairs are generated in a controlled environment. The secret exponent is used to generate the required self-signatures and is also encrypted under a Data Encryption Algorithm (DEA) key. All secret information for this key pair is then erased. A crypto module ID is assigned, the crypto module ID and public modulus are then entered into the crypto chip database for future reference. The crypto module ID, along with the hash pattern of the public modulus and the encrypted secret exponent, are sent to the chip manufacturing plant, where they are burned into the cryptographic processor. The secret information is encrypted under a DEA key which is tightly controlled and held in a single separate machine which is used to control the laser used to burn the fuses in the chip. After the fuses are burnt in the chip, a metal layer is deposited over the fuses in such a way that the information cannot be read without destroying the chip. The encrypted copy and all clear copies of the secret key are erased after it has been burnt into the cryptographic processor.

The PKSC command interface provides a new approach to the solution of the problem of secure remote access. With this interface, a crypto storage unit and crypto computational unit may be combined into a single cryptographic processor chip. The manual control panel and the key part entry device are provided by means of remote secure terminals, the secure cable is replaced by the use of public keys and digital signature over a public channel which does not require security or integrity, and the dual control function is enhanced by means of an N-of-M voting control function.

PKSC is based on the use of multiple secure workstations attached to a secure crypto module by means of unsecured links. The workstations are made secure by means of physical keys and locks. The crypto module is made secure by means of physical packaging and tamper detection circuitry. The crypto module and the workstations each have a secret-key public-key pair. The program at the workstation provides to the security officer an interface that works and acts like a crypto manual control panel, providing all the functions of the previous implementations, along with new functions.

This scheme has the following advantages over the previous scheme:
1. Control panels, physical keys, switches, and smart card reader no longer need to be attached to the mainframe.
2. No tamper-resistant cable is required.
3. No courier is needed, the security officer can control the use of the crypto facility and enter key parts directly from the comfort of his own office.

A signature requirement array permits different criteria to be set up for each type of PKSC operation. For each type of operation there are three masks indicating the authorities who are eligible to participate, and for each of these, a count indicating the number of these who must sign before the criteria is met. The existence of three sets of criteria permits an operation in which two or three groups, representing different departments, or controlling agents, can be separately required to participate.

A pending command register (PCR) is defined to hold multiple-signature commands. The PCR also contains a signature summary mask and a 16-byte pending command ID (PCID) which is the hash pattern of the multiple-signature command. A Query PCR command permits authorities to examine the contents of the PCR before signing.

A special command, called Cosign, permits an authority to approve the pending command. The Cosign command includes a 16-byte field which must match the PCID. Since the PCID is unique, this ensures that the Cosign command cannot be replayed and cannot be delayed to approve a different command.

The signature summary mask indicates what authorities have cosigned. When a new command is loaded into the PCR, all bits in the signature summary mask are cleared thus requiring that cosignatures must be done anew. The PCR is cleared if a single signature command is executed. This guarantees that the state of the transport registers cannot be changed while a multiple-signature command is waiting for the required signatures.

A 16-byte crypto module signature sequence number (CMSSN) provides a hardware-enforced mechanism to display and verify all activity at the cryptographic processor. A fresh random value is placed in the CMSSN when the crypto module is initialized. The left-most 8 bytes of this value do not change as long as the crypto module is not reinitialized. Thus, these bytes are an indication of whether or not the module has been reinitialized. The rightmost 8 bytes of the CMSSN are incremented each time the crypto module signs a reply. Thus, these bytes are an indication of how much, if any, activity has occurred. For example, if the customer checks the CMSSN before leaving work on Friday evening, and checks it again on Monday morning and it hasn't changed, then the customer knows that no one has used the module during the weekend. Similarly, if everyone who interacts with the crypto module is required to keep a journal of all activity, then missing CMSSN values in the journal is an indication that activity has occurred without being logged.

While it may appear that the CMSSN only indicates compromise to the system but does not prevent it, this is not the case. The CMSSN permits one authority at various stages of the process to verify that the other authorities have performed the proper, and only the proper, actions. This information provides the tools necessary to avoid taking the subsequent steps which would lead to compromise.

The fact that the cryptographic processor provides positive evidence of any activity in the module can be used as a very important tool in the customer's security procedures. This leads to higher security and greater confidence in the units supplied by a particular manufacturer.

Operations are separated into commands and queries. This permits these two portions to be retried separately, reduces the problems caused by a lost reply, and also helps to keep the sequence numbers in step when an error occurs. Random query IDs (QIDs) are used to guarantee fresh query information.

To avoid replay of commands, a two-part transaction sequence number (TSN) is used. One part is randomized at initialization, the other is sequential. The random part of this value eliminates the replay problem of reinitialization; the sequential part eliminates the performance problem which would occur if a new random TSN were generated after each command, and allows command sequence to be audited.

A separate TSN is associated with each authorization register; this permits each authority to keep track of the current value without interference from other authorities. It also provides tracking of the number of signed commands used by each authority.

BRIEF DESCRIPTION OF THE DRAWINGS

FIG. 5 shows the PKSC control block (PCB).

FIG. 6 shows the signature requirement array (SRA).

FIG. 7 shows a particular entry in the signature requirement array (SRA).

DESCRIPTION OF THE PREFERRED EMBODIMENTS

Public Key Security Control (PKSC) Overview

Figure 1:
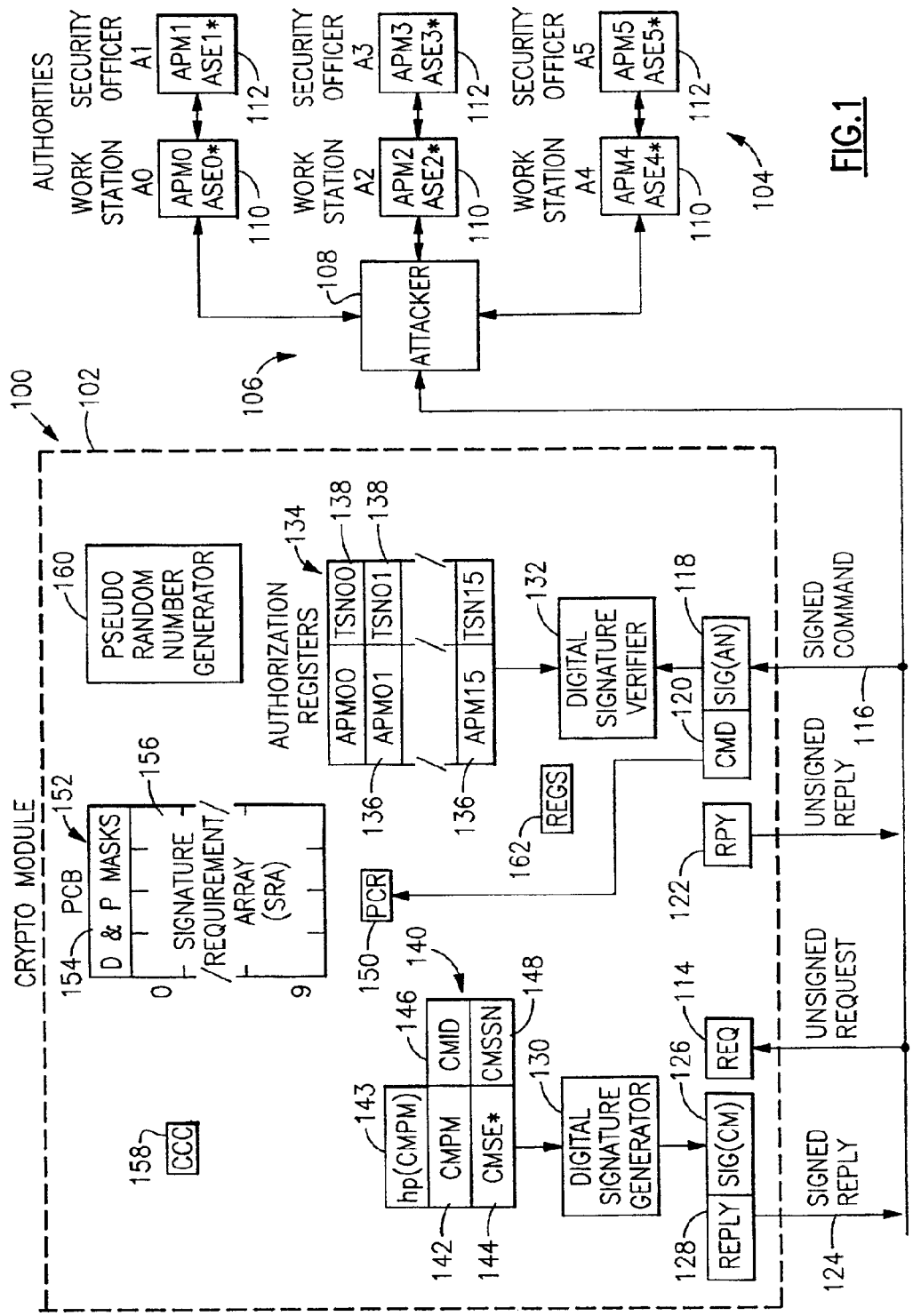
FIG. 1 is a schematic block diagram of an information handling system incorporating the present invention.

FIG. 1 is a schematic block diagram of an information handling system 100 incorporating the present invention. As shown in FIG. 1, in system 100 a crypto module 102 is coupled to one or more authorities 104 (A0–A5) via a network 106 to which an attacker 108 is presumed to have access. Crypto module 102 may be either a standalone unit or physically integrated into a central processor complex (CPC) (not separately shown) of a general-purpose digital computer. Authorities 104 may comprise either workstations 110 (A0, A2, A4) or security officers 112 (A1, A3, A5).

The internal elements of the crypto module 102, described in more detail below and in the related applications referred to above, will now be briefly described. The following table provides an explanation of various terms used in FIG. 1:

| | |
|---|---|
| APMn | Public Modulus for Authority n |
| ASEn* | Secret Exponent for Authority n |
| CCC | Crypto Configuration Control |
| CMID | Crypto Module ID |
| CMPM | Crypto Module Public Modulus |
| CMSE* | Crypto Module Secret Exponent |
| CMSSN | Crypto Module Signature Sequence Number |
| PCB | PKSC Control Block |
| PCR | Pending Command Register |

*Information is secret

A particular authority n (An) 104 interacts with the crypto module 102 by way of either an unsigned request (Req) or query 114 or a signed command 116 having a digital signature 118 (Sig(An)) of the authority n appended to a signed portion 120 (Cmd). The crypto module 102 responds to a signed command 116 or an unsigned query 114 with a signed reply (Reply) 124 having a signature (Sig(CM)) 126 appended to a signed portion 128. When a request command cannot be performed because of error or other abnormal conditions, the crypto module 102 responds to the request command 116 or 114 with an unsigned reply (Rpy) 122.

Figure 2:
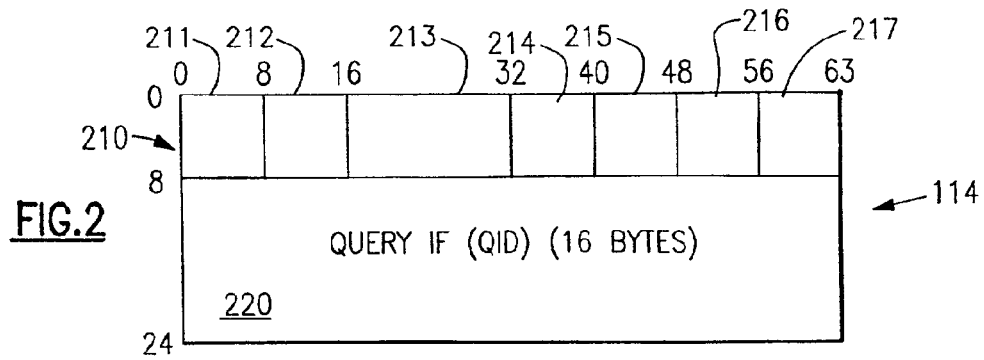
FIG. 2 shows the format of a typical query.

FIG. 2 shows the format of a typical query 114, which in the disclosed embodiment has a total length of 24 bytes (192 bits). Query 114 contains an 8-byte (64-bit) header 210 made up of various fields 211–217, followed by a 16-byte (128-bit) query identifier (QID) 220 that is generated randomly by the originating authority 104.

Figure 3:
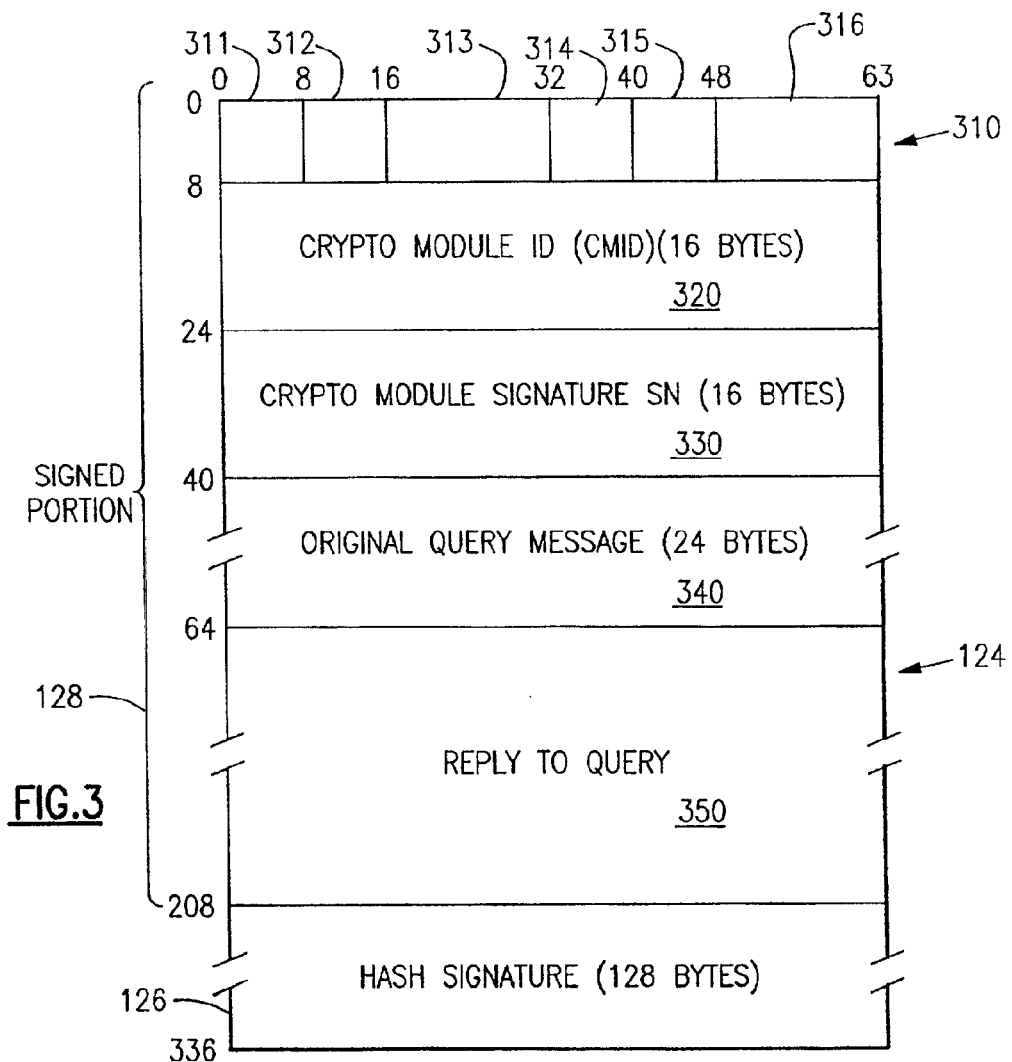
FIG. 3 shows the format of a typical reply to a query.

FIG. 3 shows the format of a typical reply 124 to a query 114, which in the disclosed embodiment has a total length of 42 bytes (336 bits) consisting of a 26-byte (208-bit) signed portion 128 and a 128-byte (1024-bit) digital signature 126. Signed portion 128 contains an 8-byte (64-bit) header 310 made up of various fields 311–316, followed by a 16-byte (128-bit) crypto identifier (CMID) 320, a 16-byte (128-bit) crypto module signature sequence number (SMSSN) 330, a 24-byte (192-bit) copy 340 of the original query message 114 and, finally, a 144-byte reply proper 350.

Figure 4:
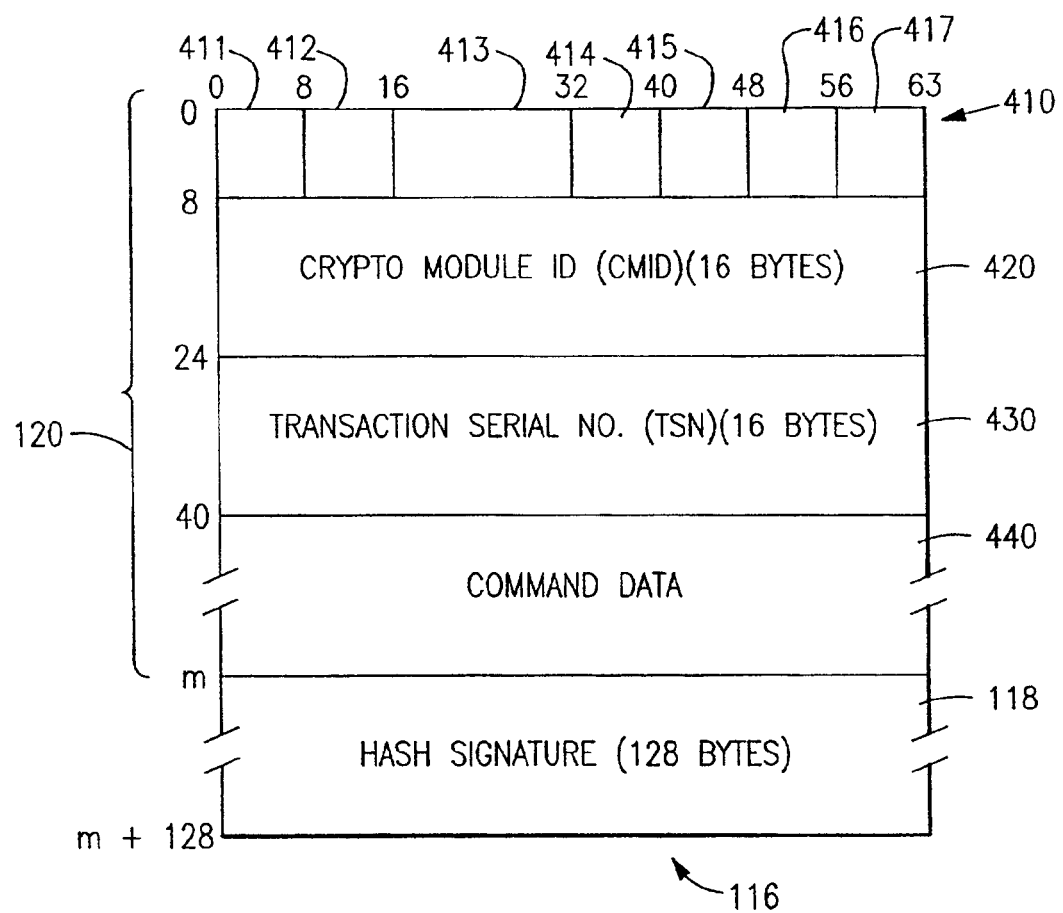
FIG. 4 shows the format of a typical signed command.

FIG. 4 shows the format of a typical command 116. Signed portion 120 contains an 8-byte (64-bit) header 410 made up of various fields 411–417, followed by a 16-byte (128-bit) crypto identifier (CMID) 420, a 16-byte (128-bit) transaction sequence number (TSN) 430 (in commands requiring a signature of the issuing authority 104), and a variable-length portion 440 containing command data, the nature of which varies with the command. Following the signed portion 120 is a 128-byte (1024-bit) hash signature 118. In the disclosed embodiment, header fields 411 and 412 contain the respective hexadecimal values '00' and '03' for all commands, while the content of fields 413–417 varies with the command.

A digital signature generator 130 is used to generate the digital signature 126 appended to a reply 128, while a digital signature verifier 132 is used to verify a signature 118 received from an authority 104.

A set of authorization registers 134 store authorization information, including a public modulus (APMn) 136 and a transaction sequence number (TSNn) 138, for each authority n for up to 16 different authorities 104 in the embodiment shown. The public modulus 136 is used by digital signature verifier 132 to verify a digital signature 118 received from an authority 104. The transaction sequence number 138 is used to compare with the sequence number 430 in the command 116 received from an authority 104, as described below.

Crypto module 102 also has a set of registers 140 for storing various crypto module information, including a crypto module public modulus (CMPM) 142, a crypto module secret exponent (CMSE) 144, a crypto module identifier (CMID) 146, and a crypto module signature sequence number (CMSSN) 148. CMPM 142 and CMSE 144 are used by digital signature generator 130 to generate the digital signatures 126 appended to replies 128 to queries 114 or commands 116. CMID 146 and CMSSN 148 are used for purposes to be described below. In a similar manner, each authority 104 also stores a public modulus APM and a secret exponent ASE that it uses to generate a digital signature.

A pending command register (PCR) 150 is used to track the progress of commands requiring multiple signatures, as described below.

A PKSC control block (PCB) 152 contains a set of masks 154 specifying various authorizations for the authorities 104 and the like, followed by a signature requirement array (SRA) 156 specifying signature requirements for each of a plurality of command types.

In addition to the storage areas described above, crypto module 102 contains a crypto configuration control (CCC) 158, a storage area containing various fields for specifying the operation of the crypto module.

Figure 16:
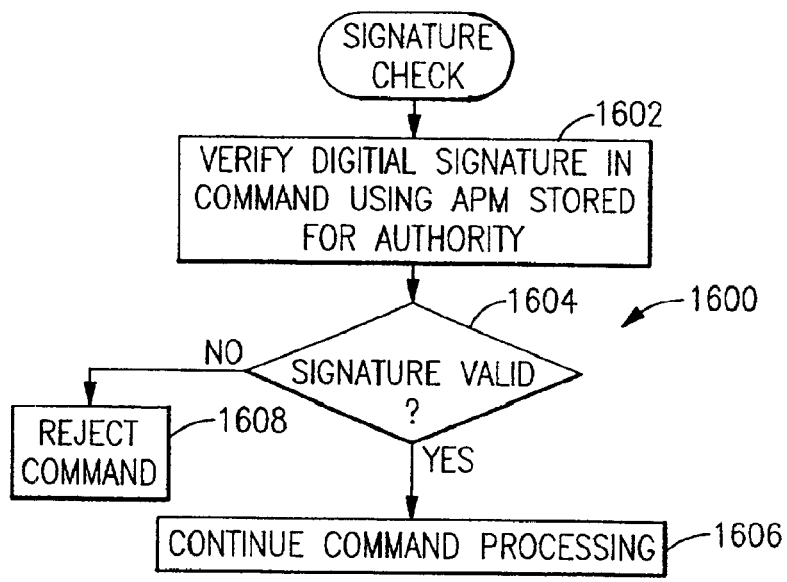
FIG. 16 shows the signature verification procedure.

Finally, crypto module 102 contains a pseudorandom number generator (PRNG) 160 for generating in a cryptographically secure manner the various random numbers used in the cryptographic procedures performed by the crypto module. PRNG 160 is described in the following copending applications of R. S. DeBellis et al., filed May 15, 1997, and incorporated herein by reference:

"Pseudorandom Number Generator", Ser. No. 08/856,562;

"Pseudorandom Number Generator with Backup and Restoration Capability", Ser. No. 08/856,882;

"Pseudorandom Number Generator with Normal and Test Modes of Operation", Ser. No. 08/856,828;

In addition to the registers already described, crypto module 102 also contains various master key registers and transport registers, indicated collectively as REGS 162 in FIG. 1 and illustrated more fully in FIG. 16 of the copending application of R. M. Smith, Sr. et al. (Ser. No. 08/885,612) referred to above.

Security Assumptions

As already stated, FIG. 1 shows an attacker 108 in the network 106 between the authorities 104 and the crypto module 102. This is to indicate the types of attacks which the disclosed public key security control is designed to prevent. It is assumed that information in the crypto module 102, in the workstations 110, and associated with security officers 112 is secure, but all information to and from the crypto module may be monitored, altered, rerouted, or discarded by the attacker 108 and that additional messages may be inserted into the network 106 by the attacker 108.

It should be noted, however, that an attacker 108, to be successful, must be subtle. Thus, for example, if an attacker 108 were to simply refuse to transmit any messages, such an action would make it immediately obvious to all in the network 106 that the network is broken and the attacker would be discovered and removed.

Types of Authorities

In FIG. 1, both workstations 110 and security officers 112 are shown as authorities 104. This is to indicate that the secret key used to sign a message from an authority 104 may be associated either with the workstation 110 or with the security officer 112. The secret key associated with a workstation 110 remains with the workstation. In the case of a secret key associated with a security officer 112, the key may be carried on a security card and then read into the workstation 110, but when the security officer 112 leaves, the key is erased from that workstation 110. Thus, the secret key moves with the security officer 112 from one workstation 110 to another.

PKSC Security

Security provided by the PKSC consists of separate mechanisms to provide integrity and secrecy. At initialization time, security is built up in stages, first integrity of the crypto module 102, then integrity of the authorities 104, and finally these integrity mechanisms are used as part of the process to establish secrecy.

Initial State

The crypto module 102 receives power from two sources: regular power and battery back up. If power from both sources is removed, all volatile storage in the crypto module 102 is erased. This is called crypto module reset. Crypto module reset is also performed by the Initialize Crypto Module (ICM) PKSC command.

After crypto module reset, the crypto module 102 is available on a first-come-first-served basis, that is, anyone, including an attacker 108, can take control of the crypto module 102. However, since no secret information is shared during the first parts of initialization, there is no exposure to loss of security during this part of the process.

At each step of the initialization process, each of the authorities 104 can examine the state of the crypto module 102 and ensure that control has been properly established and that only the proper authorities have been given control. Thus, if an attacker 108 takes control during this process, the rightful authorities 104 soon become aware of this and refuse to cooperate and do not provide any of the essential information necessary to use the crypto module 102 in a useful application.

PKSC Integrity

Most of the communication between crypto module 102 and the authorities 104 is not secret, but does require integrity. Integrity of communication is ensured by means of public key digital signatures.

Public key cryptography as used for data privacy, digital signatures and the like is well known in the art. Whereas conventional (or symmetric) cryptography such as the Data Encryption Standard (DES) uses the same secret key for both encryption and decryption, public key (or asymmetric) cryptography uses separate keys for encryption and decryption. A person wishing to receive a message generates a key pair in such a manner that the decryption key cannot be feasibly derived from the corresponding encryption key of the pair. The person then makes the encryption key public while keeping the decryption key secret. Anyone having access to the public encryption key can encrypt a message to the receiver. However, only the receiver can decrypt the message, since only he possesses the decryption key and no other person can feasibly derive the decryption key merely from knowledge of the public encryption key.

Perhaps the best known example of public key encryption is RSA encryption, named after its originators Rivest, Shamir, and Adleman. RSA is described in B. Schneier, *Applied Cryotography* 1996, pp. 466–471, and in U.S. Pat. No. 4,405,829, both incorporated herein by reference. In RSA encryption, a person wishing to receive an encrypted message generates a public modulus n, a private exponent d and a public exponent e. The public modulus n and the public exponent e together constitute the public key. A sender transforms a plaintext message m into a ciphertext block c by performing the modular exponentiation operation $$c=m^e \bmod n,$$

while similarly the receiver decrypts the ciphertext block c to recover the plaintext message m by performing the inverse operation $$m=c^d \bmod n.$$

Although public key encryption is more computationally intensive than conventional encryption, it has the singular advantage that it does not require the secret transmission of a key. All that is required is that the public encryption key be communicated to potential users with integrity, so that the users are assured that the public key actually originates from the recipient and has not been altered.

Similar public key techniques may be used for digital signature generation and verification. Here too, a public/private key pair is generated. The private key is used to encrypt a hash or digest of the original message to generate a message signature. The public key is used to verify the signature by generating a similar hash of the message, decrypting the received signature, and comparing the two results. Only the possessor of the private signature key can sign a message, whereas anyone having access to the public key can verify the message signature.

Although the RSA public key cryptosystem is used in the disclosed embodiment, the invention is not limited to this particular public key cryptosystem, and other cryptosystems may be used. Thus, while references to keys herein are to RSA keys, the invention is not so limited. Messages requiring integrity from the crypto module 102 to the authorities 104 are signed by the crypto module using its own secret key (CMSE) 144 and verified by the authority using the crypto module public key. Similarly, messages requiring integrity from an authority 104 to the crypto module 102 are signed by the authority using its own secret key (ASE) and verified by the crypto module using the public key of the authority.

To ensure the integrity of this communication, it is necessary to install the public key of the sender in the receiver with integrity.

Crypto Module Key Generation

During the manufacturing process, a unique 128-bit crypto module ID (CMID) 146 and a unique 1024-bit RSA key is generated for each crypto module 102. As described above, an RSA key consists of a public modulus, a public exponent, and a private exponent. The public exponent for all PKSC RSA keys is a fixed value of 65,537 ($2^{16}+1$). The public modulus part of this RSA key is called the crypto module public modulus (CMPM). The CMID, the crypto module secret exponent (CMSE), and the hash pattern hp(CMPM) of the crypto module public modulus CMPM are placed in nonvolatile storage 140 in the crypto module 102. CMPM 142 is 128 bytes in length and can be queried by means of a Query Module Information (QMI) PKSC query command 114 to be described; the corresponding hash pattern hp(CMPM) is stored at 143. CMSE 144, which is kept secret, is placed within shielding to prevent discovery of the value without destruction of the chip.

During the manufacturing process, CMSE 144 is used to sign four PKSC commands 116: an Initialize Crypto Module (ICM) command which loads CMPM 142 and sets the CCC 158 to disable all functions except for the initialization commands, and three Load Initialization Modulus (LIM) commands which load the public modulus APM of three different initialization authorities 104. Depending on the manufacturing process, additional ICM commands 116 which set up some of the most common configurations may also be signed. After CMSE 144 is placed in the crypto module 102, and all of these self-signature initialization commands 116 have been signed, the CMSE value is erased and no record of this information (outside of the tamper-proof area 144) is kept.

CMID 146 and the signatures of the four commands are kept in a special database called the crypto module certification center database. If additional signatures were generated, then this information is also placed in the database, but these signatures must be kept secret.

Crypto Module Certification Center

To provide integrity, it is necessary for each of the authorities 104 to verify that they are communicating with the intended crypto module 102 and not being routed to an incorrect or fictitious crypto module simulated by an attacker 108.

Authentication of the crypto module 102 is done by means of a Crypto Module Certification Center provided by a suitable certification authority, such as the manufacturer of the crypto module 102. The certification center maintains a list of all crypto modules 102 produced by the manufacturer and the current status of each. Status includes the public modulus 142 (CMPM) of the crypto module 102, the signatures 118 of the four self-signed initialization commands 116, and other information such as where the crypto module is installed and whether it has been replaced, or reported missing or stolen.

During the initialization process, the authority 104 begins by querying the crypto module 102 using the Query Module Information (QMI) PKSC command 114. Since the crypto module 102 has not yet been initialized, the response is not signed, 124 but it does contain the crypto module ID (CMID) 146.

Figure 12:
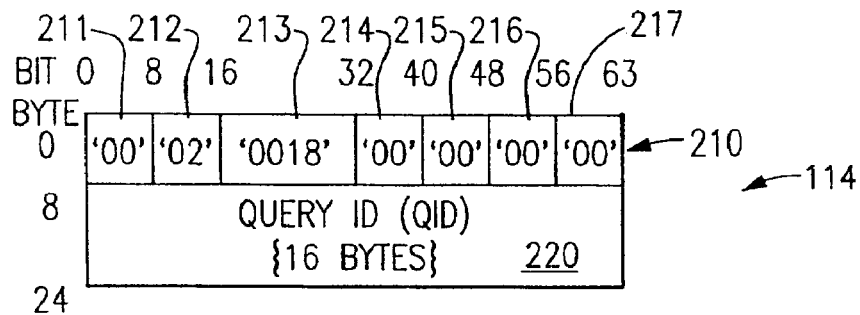
FIG. 12 shows the format of a Query Module Information (QMI) query.
Figure 13:
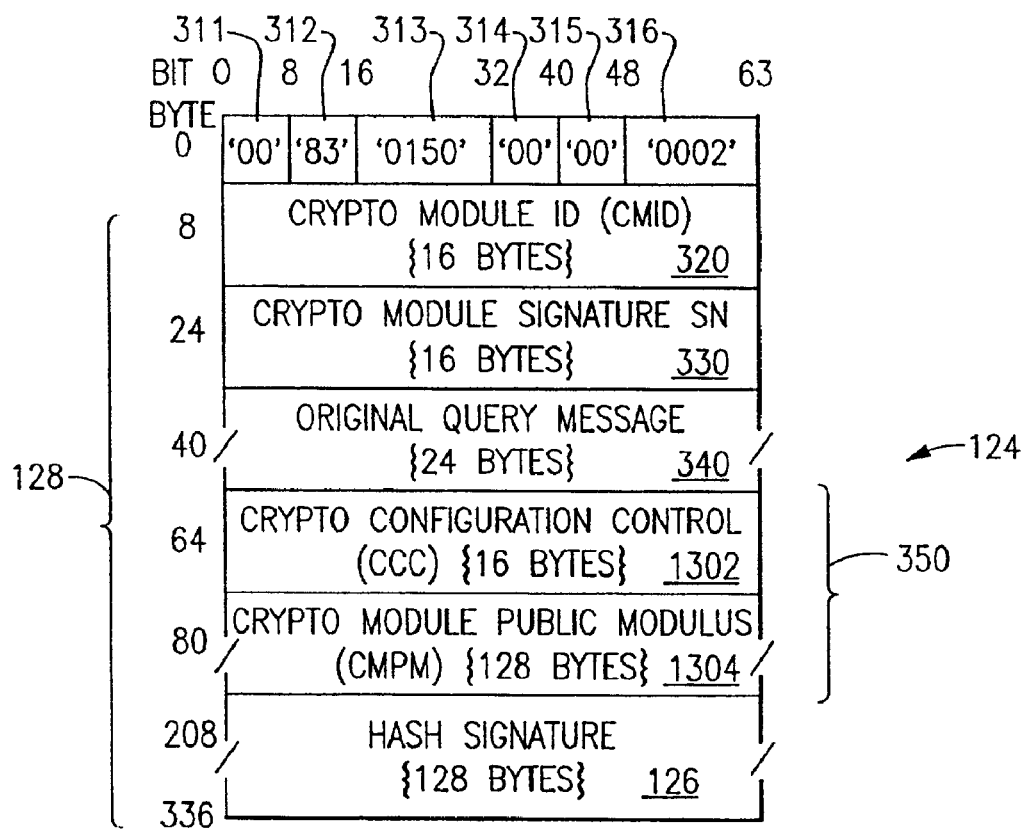
FIG. 13 shows the format of a reply to a QMI query.

FIG. 12 shows the format of a Query Module Information (QMI) query 114, while FIG. 13 shows the format of a reply 124 to a QMI query. In the query header 210, the field 214 ('00') identifies the query 114 as being a QMI query. In the reply 124, the return data 350 comprises a copy 1302 (16 bytes in length) of the crypto configuration control (CCC) information 158, followed by a copy 1304 of the crypto module public modulus (CMPM) 142 (128 bytes in length).

The authority 104 then calls the certification center, perhaps by means of an 800 number, and requests information concerning this particular crypto module ID. The certification center then checks its database to verify the status of the crypto module 102 identified.

Depending on the configuration to which the end user is entitled, and, in some cases, depending on positive identification of the authority 104, the certification center may send the authority 104 a single Initialize Crypto Module (ICM) PKSC command which establishes the CMPM and also the final values for the crypto configuration control, or the certification center may send signatures for the ICM command and two of the three Load Initialization Public Modulus (LIM) commands. When multiple initialization commands are required, the crypto module certification center must communicate with the crypto module 102 in an interactive manner to set up the desired configuration.

At the completion of the initialization process, the authority 104 issues the Query Module Information (QMI) command. If the certification center has given an acceptable report for this particular crypto module 102, if the initialization commands have been accepted, and if the response to the QMI verifies using the public key of the crypto module, then the authority 104 can be assured that communication is to the desired crypto module and not an alternate or a fictitious one.

Establishing Integrity of the Authorities

After the initialization process is complete, a command from an authority 104 to the crypto module 102 is performed by the crypto module only if the crypto module can verify the integrity of the command, that is, that the command came from a source authorized to control this crypto module 102. This is accomplished by installing the public keys of the authorities 104 in the crypto PKSC Commands Commands from authorities 104 to the crypto module 102 may be either unsigned requests or queries 114 or signed commands 116. Signed commands are of five types: single-signature, multiple-signature, cosignature, self-signature initialization, and two-signature initialization.

All information in the crypto module 102 except that specifically marked as secret can be obtained by means of queries 114. In the case of most secret information, the hash pattern of the secret information is provided. Queries 114 are unsigned and are sent from the authority 104 to the crypto module 102. Included in the query 114 is a 16-byte query ID (QID) field 220 (FIG. 2), which is a random number generated by the workstation 110 and used only once. The reply 124 to a query 114 is signed by the crypto module 102 and contains, as part of its copy 340 of the original query 114, the QID 220 from that query. The use of the QID eliminates the possibility of replay by an attacker 108. Thus, the authority 104 is assured of up-to-date information.

Single-signature commands 116 are used to operate on information in the crypto module 102 which does not need to be authenticated by multiple authorities 104. When the PKSC signature verification control (CCC bit 7) is zero, single-signature commands 116 are accepted without verification. When the PKSC signature verification control (CCC bit 7) is one, single-signature commands 116 are accepted if signed by any of the authorities 104 listed in the authority registers 134.

FIG. 16. shows the basic signature checking sequence 1600 performed for commands 116 requiring a signature 118. The digital signature verifier 132 verifies the signature 118 using the stored public modulus (APM) 136 of the authority 104 issuing the command 116 (step 1602). If the signature is valid (step 1604), command processing continues (step 1606). Otherwise, the command 116 is rejected (step 1608).

Multiple-signature commands 116 are not executed directly, but are placed in the pending command register (PCR) 150 and held pending until sufficient cosignatures 118 have been received to meet the requirements for that particular type of command. The signature requirement array (SRA) 156 contains the requirements for each type of multiple-signature command.

When a multiple-signature command 116 is placed in the PCR 150, a 16-byte value (PCID) is generated and placed in the PCR. This permits each authority 104 to query the appropriate fields in the crypto module 102 before cosigning the pending command 116. If, during this time, any of the authorities 104 were to change the pending command, a new PCID would be generated and the Cosign command intended to cosign one command could not be misused to sign a different one.

Crypto Module ID (CMID)

During the manufacturing process, a unique 128-bit value is generated for each crypto module 102. This value, called the crypto module ID (CMID), is 16 bytes in length and is returned in all PKSC reply messages sent by the crypto module 102.

PKSC Control Block (PCB)

PKSC control block (PCB) 152 contains the primary controls for controlling and restricting the PKSC commands 116. FIG. 5 shows the PKSC control block 152, which consists of four mask fields 502, 504, 506, 508 and the signature requirement array (SRA) 156. The PCB 152 can be queried by means of the Query Control Block (QCB) PKSC query 114 and can be loaded by means of the Load Control Block (LCB) PKSC command 116. The PCB 152 is 80 bytes in length and is set to all zeros by crypto module reset.

Signature Requirement Array (SRA)

Signature requirement array (SRA) 156 is provided to accommodate different user environments and requirements and may be set during initialization to indicate which authorities 104 are permitted to execute or cosign a particular multiple-signature command 116.

Referring to FIGS. 6–7, SRA 156 contains an entry 602 for each of ten different multiple-signature commands 116 in the disclosed embodiment. Each entry 602 indicates which authorities 104 are eligible to execute, or cosign, and how many signatures 118 are required to meet the requirement. A pending command 116 is not executed until all the requirements for that command have been met.

Thus, for example, SRA 156 can be set up to permit any two out of three security officers 112 to issue a Load Environment Control Mask (LEC) command 116 from any workstation 110. The SRA entry 602 for a Load PKSC Control Block (LCB) command 116, on the other hand, might be set up to require a different set of security officers 112 and require signatures 118 from both security officers and work stations 110.

In the disclosed embodiment, the signature requirement array (SRA) 156 contains ten 8-byte entries 602, one for each of the ten multiple-signature commands 116. Each SRA entry 602 contains three signature requirement specifications. FIGS. 6–7 show the signature requirement array 156 and a signature requirement array entry 602.

Each signature requirement specification consists of a 4-bit count 704 and a 16-bit mask 706. The 16-bit mask 706 indicates which authority signatures 118 are eligible to be counted for that requirement and the count 704 indicates how many signatures are required to meet the requirement. If the count 704 is zero, then the requirement is considered to be satisfied and the mask 706 is ignored. In the present embodiment, bits 0–3 (r) of the signature requirement array entry 602 make up a reserved field 702; the bits are not examined by the machine, but should be set to zero. Bits 4–7 (C1), 8–11 (C2), and 12–15 (C3) of the signature requirement array entry 602 are the first, second, and third counts 704, respectively. Bits 16–31, 32–47, and 48–63 of the signature requirement array entry 602 are the first, second, and third masks 706, respectively.

Pending Command Register (PCR)

Figure 8:
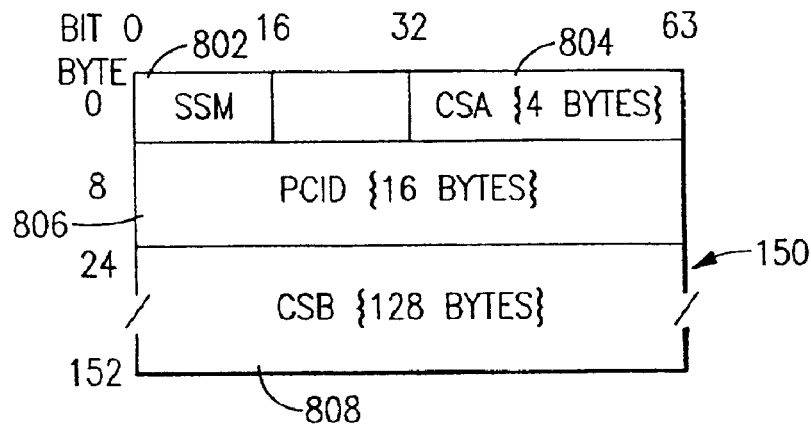
FIG. 8 shows the pending command register (PCR).

A PKSC command 116 which requires multiple signatures 118 is placed in the pending command register 150 while the multiple signatures are being processed. Queries 114 and cosign commands 116 can be performed while a command is held in the PCR 150. All single-signature and self-signature initialization commands 116, however, cause the PCR 150 to be cleared. FIG. 8 shows the pending command register 150.

Bits 0–15 of the PCR 150 are a signature summary mask (SSM) 802. These bits correspond to authorities 104 (A0–A15) and indicate which authorities have signed (or cosigned) the pending command 116.

Figure 10:
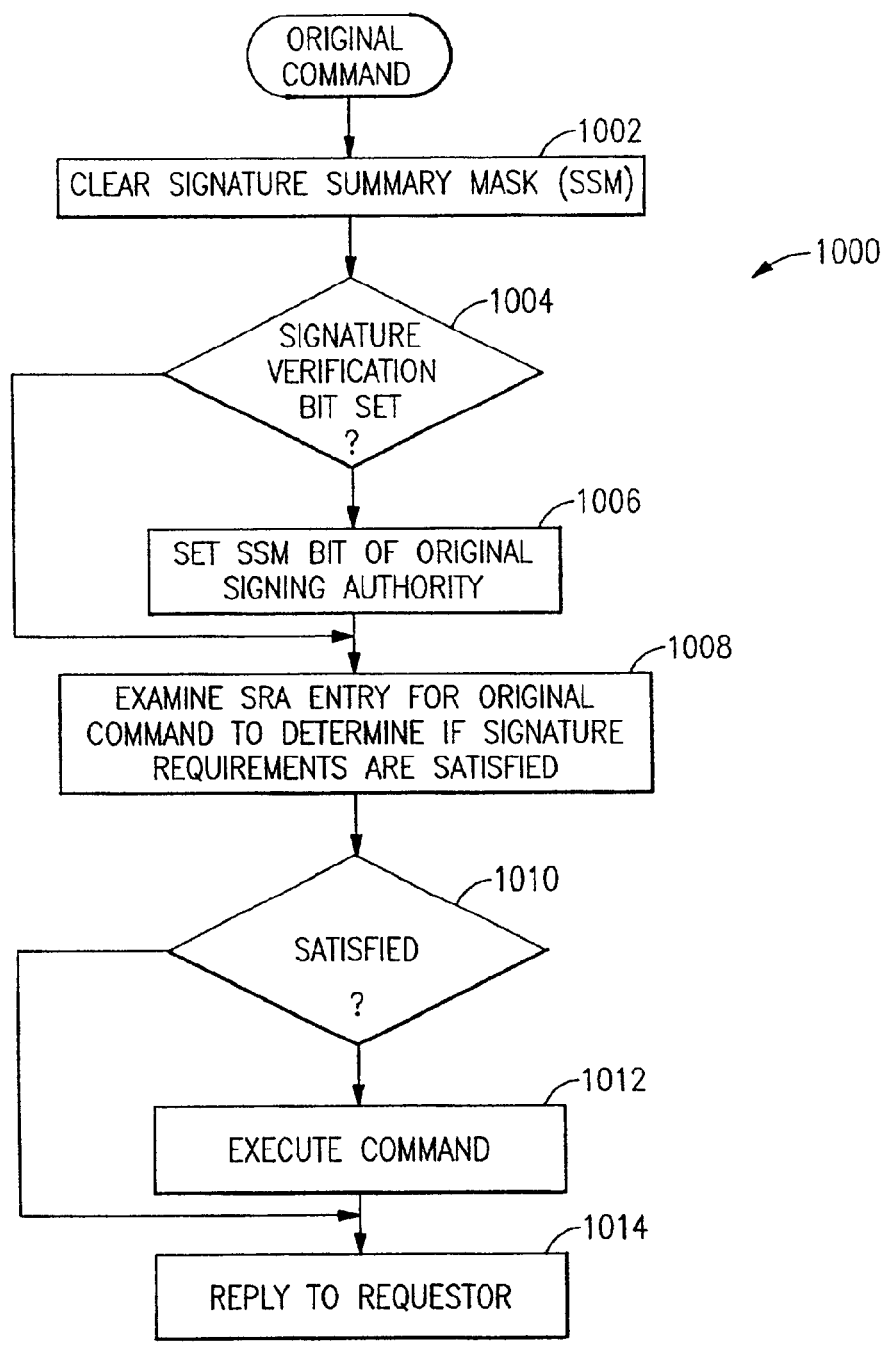
FIG. 10 shows the general procedure for processing the original command of a multiple-signature command.

FIG. 10 shows the general procedure 1000 for processing the original command of a multiple-signature command. When a command 116 is loaded into the PCR 150 all SSM bits are set to zero (step 1002). Then, if PKSC signature verification (CCC bit 7) is one (step 1004) and signature verification for the command is successful, the SSM bit corresponding to the authority 104 signing the command 116 is set to one (step 1006).

The SRA entry 602 for the command 116 in the PCR 150 is then examined to determine if all three signature requirement specifications for the pending command are satisfied (step 1008). For this to occur, for each of the three requirements, the required number (as indicated by a particular count 704) of authorities who are permitted to concur (as indicated by the corresponding mask 706) have in fact concurred. If not, then a normal completion reply is returned (step 1014). If all three signature requirement specifications are satisfied (step 1010), then the PCR execution phase for the pending command 116 takes place (step 1012) before the normal completion reply is returned for the original command (step 1014).

As described below, each time a Cosign command 116 is successfully executed, the SSM bit corresponding to the signing authority 104 of the Cosign command is set to one. Commands 116 may be loaded and cosigned by any of the authorities 104 regardless of whether that authority is listed in the signature requirement array 156 as a required signer for the command, but the pending command is not executed until all the signature requirements for the particular command are satisfied.

When the PKSC signature control is zero, commands 116 may be loaded into the PCR 150 even though the signature 118 for the command is not valid. However, the SRA entry 602 for the command must 116 be satisfied before the pending command is executed. Thus, when the PKSC signature control is zero, and all the count fields 704 in the SRA entry 602 are zero, then the command 116 is executed without requiring any valid signature 118. But if any count field 704 in the SRA entry 602 is nonzero, then valid cosignatures 118 are required to execute the command even when the PKSC signature control is zero.

Bits 32–63 of PCR 150 contain a command section A (804) for storing fields 414–417 of the original multiple-signature command.

Bytes 8–23 of PCR 150 contain a pending command identifier (PCID) 806 formed from the hash pattern of the multiple-signature command. The Cosign command 116 to be described contains a 16-byte field which must match this value in order to cosign the command.

Bytes 24–151 of the PCR contain a command section B (808) for storing the field 440 of the original multiple-signature command.

Pending command register (PCR) 150 is 152 bytes in length and can be queried by means of a Query Pending Command Register (QPC) PKSC query 114. PCR 150 is set to all zeros by crypto module reset. PCR 150 is set to all zeros at the completion of PCR execution and the PCR is also set to all zeros whenever a single-signature command 116 or self-signature initialization command is accepted.

PKSC Cosignature Command

Although there are ten different PKSC multiple-signature commands 116, a single PKSC command, the Cosign command, can be used to provide the additional signatures 118 required for any of the ten multiple-signature commands. The Cosign command 116 also provides signatures 118 for the two-signature initialization command Load Crypto Configuration Control (LCC).

After one authority 104 has loaded the PCR 150 with a multiple-signature command 116, another authority can use the Query Pending Command Register (QPC) query to determine what command is pending and thus determine whether the authority is willing to cosign the pending command. The 16-byte pending command ID (PCID) field 806 in the PCR 150 provides an authority 104 with the assurance that the command being cosigned has not been changed since it was examined by the authority.

Figure 9:
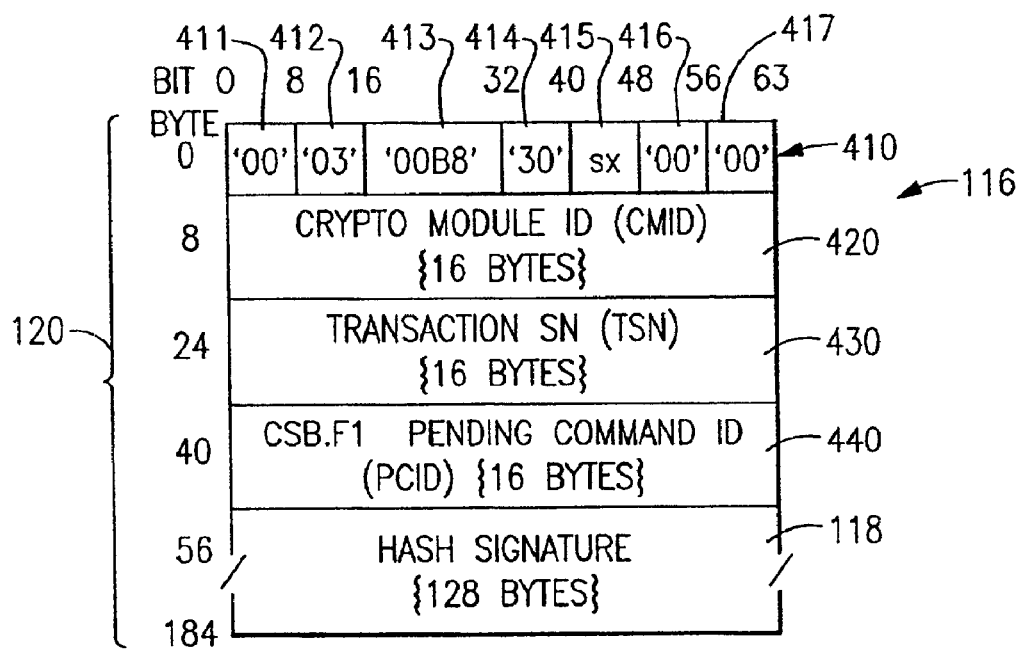
FIG. 9 shows the format of a Cosign (COS) command.

FIG. 9 shows the format of a Cosign command 116 in the disclosed embodiment. It conforms to the general format shown in FIG. 4, with fields 413–414 and 416–417 having the respective hexadecimal values '00B8', '30', '00', '00' and field 415 containing the identifier (sx) of the issuing authority 104. In the case of the Cosign command, the command data 440 (CSB.F1) comprises the 16-byte pending command ID (PCID) obtained by querying the pending command register 150.

A Cosign PKSC command 116 is accepted only if the CSB.F1 field 440 of the request message 120 is not zero and matches the PCID 806 of the PCR 150. Thus, since the PCID 806 is changed each time the PCR 150 is loaded, a Cosign command 116 based on a previous command will not be accepted after the PCR is changed, and since the PCID is set to zero when the PCR is reset, the PCR cannot be cosigned while it is reset.

Figure 11:
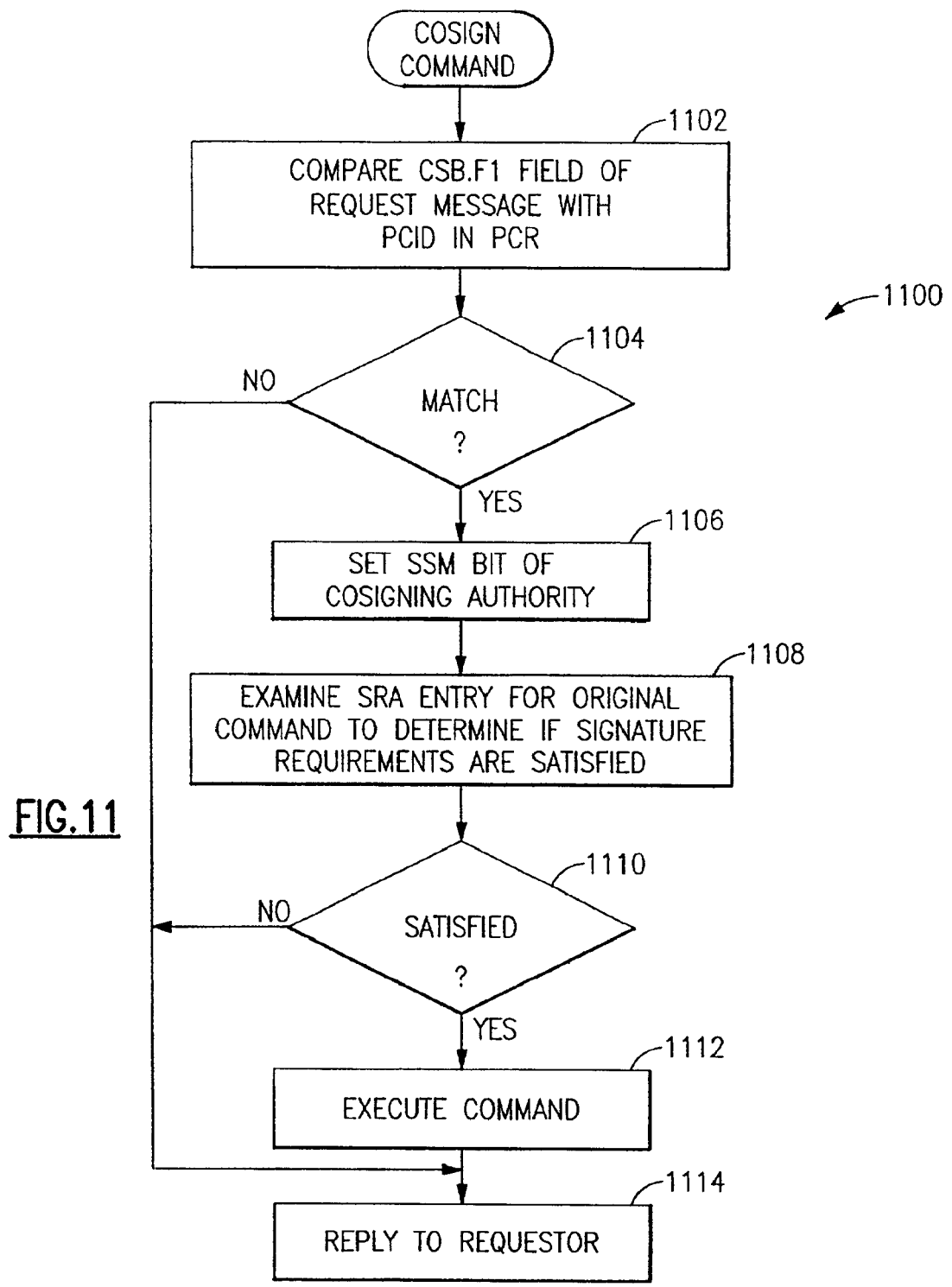
FIG. 11 shows the procedure for processing a Cosign command.

FIG. 11 shows the procedure 1100 for processing a Cosign command 116, assuming the signature verification for the command is successful. During execution of the Cosign command 116, crypto module 102 compares the CSB.F1 field 440 in the command with the PCID 806 in the pending command register 150 to determine if the two match (step 1102). If the CSB.F1 field 440 matches the PCID 806 in the pending command register 150 (step 1104), then the pending command 116 is cosigned for this authority 104. This is accomplished by setting bit sx of signature summary mask 802 to one in the pending command register 150, where sx is the authority identifier contained in field 415 of the Cosign command 116 (step 1106).

The SRA entry 602 for the command 116 in the PCR 150 is then examined to determine if all three signature requirement specifications for the pending command are satisfied (step 1108). If not, then a normal completion reply is returned (step 1114). If all three signature requirement specifications are satisfied (step 1110), then the PCR execution phase for the pending command 116 takes place (step 1112) before the normal completion reply is returned for the Cosign command (step 1114).

Signature verification always applies to COS regardless of the setting of the PKSC signature control (CCC bit 7).

Authorization Registers

Those registers which are replicated for each authority 104 are called authorization registers. The maximum number of authorities 104 supported is 16.

Authorization Public Modulus (APM)

The authorization public modulus is 128 bytes in length and can be queried by means of the QAR PKSC query command. Crypto module reset causes each APM to be set to zero, which is invalid.

Figure 14:
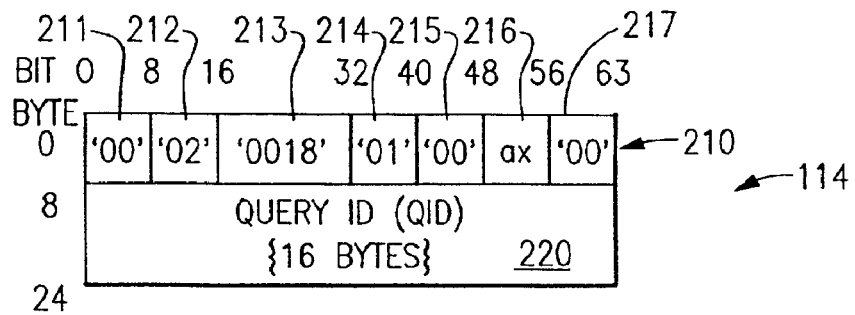
FIG. 14 shows the format of a Query Authorization Register (QAR) query.
Figure 15:
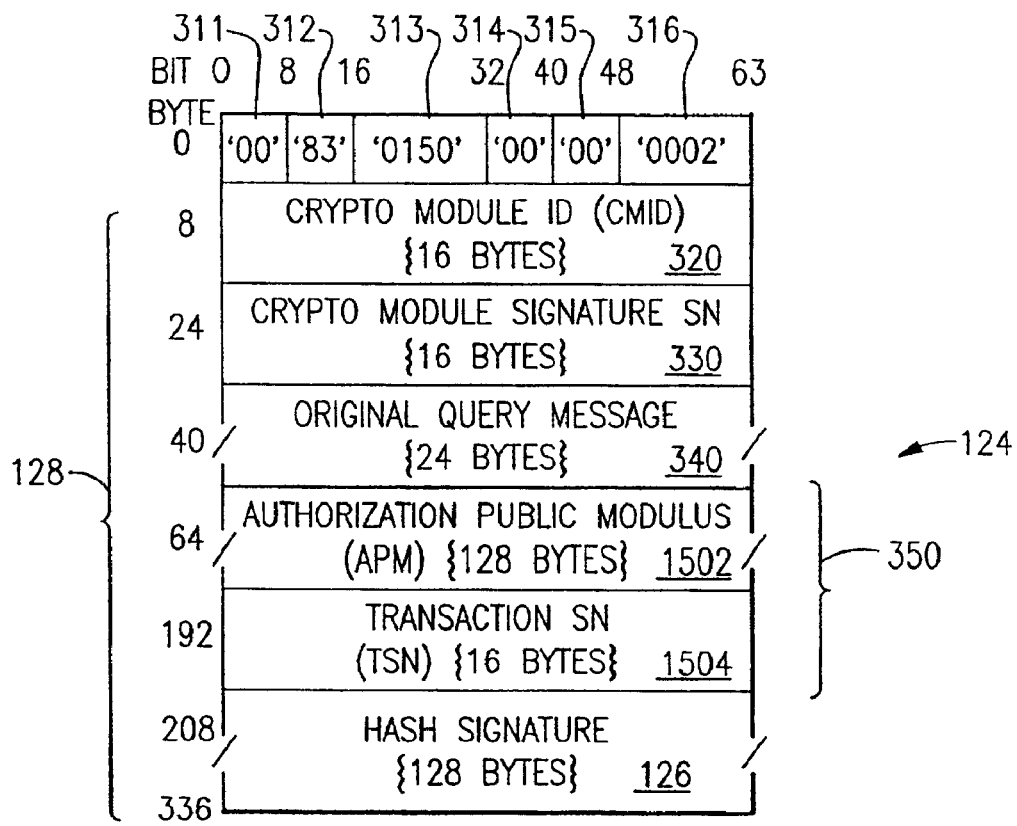
FIG. 15 shows the format of a reply to a QAR query.

FIG. 14 shows the format of a Query Authorization Register (QAR) query 114, while FIG. 15 shows the format of a reply 124 to a QAR query. In the query header 210, the field 214 ('01') identifies the query 114 as being a QAR query, while the field 216 (ax) identifies the particular authority 104 for which the information is being requested. In the reply 124, the return data 350 comprises a copy 1502 (128 bytes in length) of the authorization public modulus (APM) 136, followed by a copy 1504 of the transaction sequence number 138 (16 bytes in length).

During the initialization process controlled by the customer, each authorization register will be initialized with the public modulus of a particular authority 104. It is necessary, however, before the customer program begins, for an IBM supplied bootstrap program to be run. Since the APM of all authorization registers is reset to an invalid value by crypto module reset, the bootstrap program must set a valid value into at least one of these registers before the PKSC signature control (CCC bit 7) is set to one. It is suggested that the bootstrap program set the APM to the following value, which is the product of two primes: $(2^{512}-569)(2^{512}-629)$.

Transaction Sequence Number (TSN)

Associated with each authorization register is a 16-byte value called a transaction sequence number (TSN). The TSN can be queried by means of the QAR PKSC query command.

All commands requiring a signature by the authority also include a TSN in the command. The TSN is used to eliminate the possibility of an attacker successfully replaying a previously signed command. The use of the TSN depends on the setting of the PKSC TSN control (CCC bit 6). When CCC bit 6 is zero, the TSN in the command is ignored. When CCC bit 6 is one, the command is accepted only if the TSN in the command matches the current TSN for that authority. Regardless of whether the TSN in the command is tested, each time a command is accepted, the crypto module updates the TSN in the associated authorization register. (A command is considered to be accepted only when a reply code of '00' is returned.) The TSN is updated by incrementing the rightmost 8 bytes of the TSN by one; a carry, if any, out of the rightmost 8 bytes is ignored.

Whenever an authorization register is loaded, a new 16-byte random number is placed into the TSN for that register. Crypto module reset causes zeros to be placed into the TSN for each authorization register.

Figure 17:
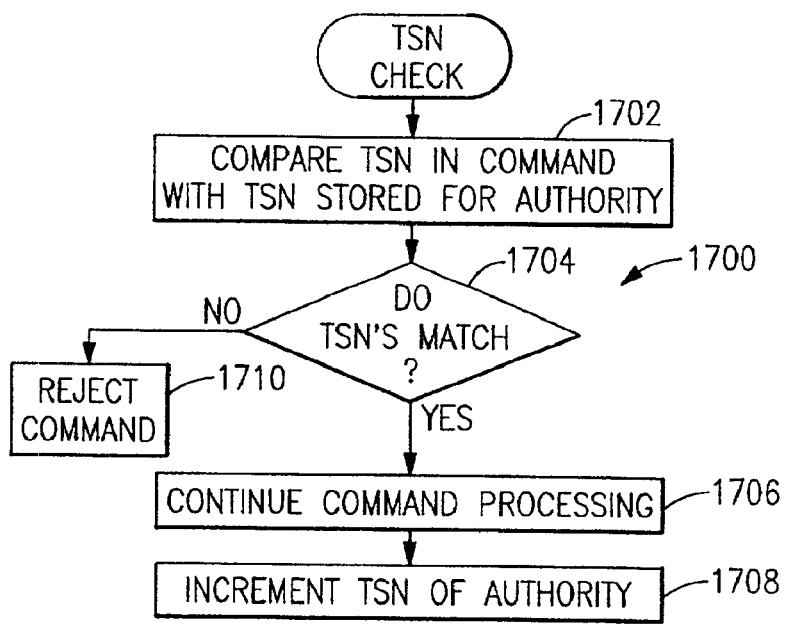
FIG. 17 shows the procedure for checking transaction sequence numbers (TSNs).

FIG. 17 shows the general procedure 1700 for checking transaction sequence numbers (TSNs). If this feature is active, then the TSN 440 in the command is compared with the TSN 138 stored for that authority 104 in the authorization registers 134 (step 1702). If the two numbers match (step 1704), then command processing continues (step 1706) and the right half of the stored TSN 138 is incremented (step 1708). Otherwise, the command is rejected (step 1710).

Crypto Module Signature Sequence Number (CMSSN)

The crypto module signature sequence number (CMSSN) is 16 bytes in length. The CMSSN is initialized to a random value by crypto module reset. All messages signed by the crypto module contain the current CMSSN. Each time, after it is used, the CMSSN is updated by incrementing the rightmost 8 bytes by one; a carry, if any, out of the rightmost 8 bytes is ignored.

Figure 18:
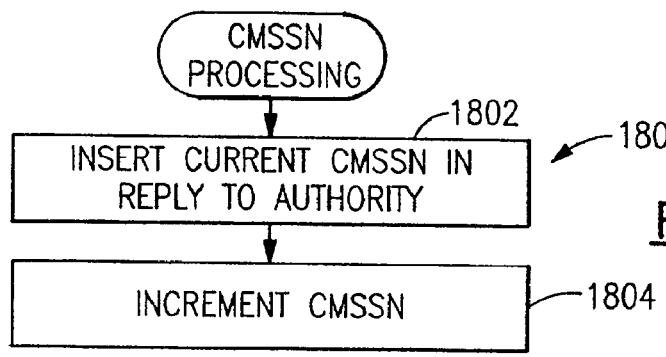
FIG. 18 shows the procedure for processing crypto module signature sequence numbers (CMSSNs).

FIG. 18 shows the general CMSSN processing procedure 1800. Each time it generates a signed reply 124 to an authority 104, crypto module 102 inserts the current CMSSN 148 in the reply (step 1802) and then increments the right half of the CMSSN (step 1804). Whereas a different TSN 138 is stored for each authority 104, a single CMSSN 148 is maintained for the authorities collectively.

Conclusion

The invention may be implemented as any suitable combination of hardware and software or microcode (i.e., a machine-readable program of instructions tangibly embodied on a program storage devices) executing on one or more hardware machines. While particular embodiments have been shown and described, various modifications will be apparent to those skilled in the art.

What is claimed is:

1. In a cryptographic system having one of a plurality of security-relevant states, an interactive method of controlling the transition of said system from an existing state to a future state under control of one or more authorities, said method being performed by said cryptographic system and comprising the steps of:

storing control information specifying permissible future states based on a current state and a requesting authority;

receiving a query from an authority as to the current state of the cryptographic system;

providing a reply to said authority in response to said query, said reply containing nonsecret state information regarding the current state of said cryptographic system and reply authentication information for enabling said authority to determine whether said reply originated from said cryptographic system;

receiving a request from an authority to change the current state of the cryptographic system, said request containing state change information indicating a proposed future state of said cryptographic system and request authentication information for enabling and cryptographic system to determine whether said request originated from said authority;

determining using said request authentication information whether said request originated from said authority; and performing said request only if the request is determined to have originated from said authority and the proposed future state is a permissible future state as specified by said control information.

2. The method of claim 1 in which said reply authentication information comprises a digital signature.

3. The method of claim 2, further comprising the step of:
storing a private key in the cryptographic system, said private key being used for generating said digital signature.

4. The method of claim 1 in which said query includes a unique query value, said reply authentication information being generated on said reply including said query value.

5. The method of claim 1, further comprising the step of:
storing a unique transaction value in the cryptographic system, a request from an authority including a transaction value, a request being performed only if the transaction value in the request is the same as the transaction value in the cryptographic system, said transaction value in the cryptographic system being updated to a new unique value upon performance of a request.

6. The method of claim 5 in which said transaction value comprises a random part and a sequential part, said sequential part being incremented upon performance of a request.

7. The method of claim 1 in which said request authentication information comprises a digital signature.

8. The method of claim 7, further comprising the step of:
storing a public key for an authority, said request being authenticated by means of said public key.

9. The method of claim 1 in which all or a portion of a proposed future state is stored in a pending command register.

10. The method of claim 1 in which said cryptographic processor transitions from said existing state to said future state through one or more intermediate states, said intermediate states being represented at least in part as a series of single bits in a signature summary mask, each bit representing the concurrence of an authority to continue the process of intermediate states toward said future state.

11. A program storage device readable by a machine, tangibly embodying a program of instructions executable by the machine to perform the method steps of claim 1.

12. In a cryptographic system having one of a plurality of security-relevant states, apparatus for interactively controlling the transition of said system from an existing state to a future state under control of one or more authorities, said apparatus being associated with said cryptographic system and comprising:

means for storing control information specifying permissible future states based on a current state and a requesting authority;

means for receiving a query from an authority as to the current state of the cryptographic system;

means for providing a reply to said authority in response to said query, said reply containing state information regarding the current state of said cryptographic system and reply authentication information for enabling said authority to determine whether said reply originated from said cryptographic system;

means for receiving a request from an authority to change the current state of the cryptographic system, said request containing state change information indicating a proposed future state of said cryptographic system and request authentication information for enabling said cryptographic system to determine whether said request originated from said authority;

means for determining using said request authentication information whether said request originated from said authority; and means for performing said request only if the request is determined to have originated from said authority and the proposed future state is a permissible future state as specified by said control information.

13. The apparatus of claim 12 in which said reply authentication information comprises a digital signature.

14. The apparatus of claim 12 in which said query includes a unique query value, said reply authentication information being generated on said reply including said query value.

15. The apparatus of claim 12, further comprising:
means for storing a unique transaction value in the cryptographic system, a request from an authority including a transaction value, a request being performed only if the transaction value in the request is the same as the transaction value in the cryptographic system, said transaction value in the cryptographic system being updated to a new unique value upon performance of a request.

16. The apparatus of claim 15 in which said transaction value comprises a random part and a sequential part, said sequential part being incremented upon performance of a request.

17. The apparatus of claim 12 in which said request authentication information comprises a digital signature.

18. The apparatus of claim 12 in which all or a portion of a proposed future state is stored in a pending command register.

19. The apparatus of claim 12 in which said cryptographic processor transitions from said existing state to said future state through one or more intermediate states, said intermediate states being represented at least in part as a series of single bits in a signature summary mask, each bit representing the concurrence of an authority to continue the process of intermediate states toward said future state.

* * * * *